United States Patent [19]

Walther et al.

[11] Patent Number: 5,798,410

[45] Date of Patent: *Aug. 25, 1998

[54] AQUEOUS DISPERSIONS OF LINEAR OLEFIN COPOLYMERS

[75] Inventors: Brian W. Walther; James R. Bethea, both of Baton Rouge, La.

[73] Assignee: The Dow Chemical Company, Midland, Mich.

[ * ] Notice: The term of this patent shall not extend beyond the expiration date of Pat. No. 5,574,091.

[21] Appl. No.: 702,824

[22] Filed: Aug. 23, 1996

Related U.S. Application Data

[63] Continuation-in-part of Ser. No. 463,150, Jun. 5, 1995, Pat. No. 5,574,091.

[51] Int. Cl.$^6$ ..................................................... C08J 27/00
[52] U.S. Cl. ........................ 524/570; 524/579; 524/158
[58] Field of Search ................................. 524/570, 579, 524/158

[56] References Cited

U.S. PATENT DOCUMENTS

| | | | |
|---|---|---|---|
| 3,360,599 | 12/1967 | Nyberg et al. | 264/216 |
| 3,418,265 | 12/1968 | McClain | 260/29.6 |
| 3,503,917 | 3/1970 | Burke, Jr. | 260/29.6 |
| 3,645,992 | 2/1972 | Elston | 260/80.78 |
| 3,734,686 | 5/1973 | Douglas | 8/137 |
| 4,123,403 | 10/1978 | Warner et al. | 260/29.2 |
| 5,037,864 | 8/1991 | Anand et al. | 523/348 |
| 5,278,272 | 1/1994 | Lai et al. | 526/348.5 |

Primary Examiner—Peter D. Mulcahy
Attorney, Agent, or Firm—Reid S. Willis

[57] ABSTRACT

Artificial latexes that are film forming at room temperature can be prepared from a copolymer of ethylene and a $C_3$–$C_{20}$ α-olefin. The copolymer is characterized by having a polydispersity index not greater than 2.5; random distribution of comonomer units along the polymer backbone; and a homogeneity index of at least 75. The copolymer preferably contains no polar substituents, which are generally necessary to make useful latexes from polyethylene.

6 Claims, No Drawings

AQUEOUS DISPERSIONS OF LINEAR OLEFIN COPOLYMERS

CROSS REFERENCE TO RELATED APPLICATION

This application is a Continuation-in-Part of the application Ser. No. 08/463,150, filed Jun. 5, 1995, now U.S. Pat. No. 5,574,091.

BACKGROUND OF THE INVENTION

Aqueous dispersions of polyolefins are known in the art, although none are reported to have been derived from polyolefins having molecular weights above 40,000. For example, in U.S. Pat. No. 3,734,686, incorporated herein by reference, Douglas et al. discloses a mechanically stable aqueous emulsion of polyethylene particles having an average molecular weight ranging from about 7,000 to 40,000. These dispersions are taught to be useful for treating carpets.

In U.S. Pat. No. 3,418,265, McClain teaches that aqueous film-forming ethylene polymer latexes containing ethylene polymer particles of submicron size can be prepared by dispersing in water an ethylene polymer and a water-soluble block copolymer of ethylene oxide and propylene oxide. No examples of stable dispersions of ethylene polymers having a molecular weight above 27,000 are reported.

Many of the polyolefin latexes previously described are actually not purely polyolefinic, but rather contain polar groups, such as acids or halides. Since the film-forming properties of these so-called polyolefin latexes are often adversely influenced by the presence of these polar substituents, it would be desirable to prepare latexes derived from higher molecular weight polyethylenes that did not contain polar groups. It would be of further value if these latexes were film forming at room temperatures.

SUMMARY OF THE INVENTION

The present invention is a film-forming, artificial latex comprising a stable aqueous dispersion of a copolymer of ethylene and a $C_3$–$C_{20}$ α-olefin having: a) a polydispersity index not greater than 2.5; b) a random distribution of comonomer units along the polymer backbone; c) a homogeneity index of at least 75; and d) an absence of polar substituents.

It has surprisingly been discovered that film-forming latexes can be prepared from this class of olefin polymer in the absence of polar substituents on the polymer backbone.

DETAILED DESCRIPTION OF THE INVENTION

The olefin polymer used to prepare the stable aqueous dispersion of the present invention is from a family of olefin polymers that are described in U.S. Pat. No. 3,645,992 by Elston. This family of olefin polymers can be characterized by being a linear copolymer of ethylene and at least one other α-olefin having four or more carbon atoms, such as 1-butene, 1-hexene, 1-octene, and 1-octadecene. Interpolymers, such as ethylene-octene-butene are also suitable for the preparation of the aqueous dispersions of the present invention. The olefin polymer is further characterized by a narrow molecular weight distribution, more particularly, a polydispersity index not greater than 2.5, more preferably from about 1.5 to not greater than 2.5, and a homogeneity index of at least 75, as described by Elston in column 6, lines 45–75. Inclusive of such polymers are EXACT™ plastomers (a trademark of Exxon Chemical, Co.).

The weight average molecular weight of the polymer used to prepare the aqueous dispersion is preferably at least about 45,000 amu, more preferably at least about 60,000 amu. The molecular weights are preferably measured by a procedure described in U.S. Pat. No. 5,278,272, column 5, line 56 to column 6, line 20, incorporated herein by reference. The olefin copolymer preferably contains no polar groups, such as acetate, ester, ether, amine, alcohol, acrylic, methacrylic, halogen, nitrile, nitro, sulfate, phosphate, or mercaptan groups; and there is preferably no post-modification step to add polar groups.

The latexes of the olefin polymers are prepared in the presence of a stabilizing and an emulsifying amount of a suitable surfactant. A preferred surfactant is a sulfate of an ethoxylated phenol represented by the formula:

wherein X is a $C_6$–$C_{18}$ linear or branched alkyl group, preferably octyl, nonyl, or lauryl, more preferably octyl or nonyl, most preferably nonyl; Φ is phenylene, preferably p-phenylene; n is from 4 to 32, preferably from 4 to 12; and Z is sodium, potassium, or ammonium, preferably ammonium. Some of the preferred sulfates of ethoxylated alkylphenols are commercially available, for example, poly(oxy-1,2-ethanediyl) alpha-sulfo-ω(nonylphenoxy) ammonium salt.

Stable aqueous dispersions of the olefin polymers can be prepared by any suitable technique, including those described in U.S. Pat. Nos. 3,360,599; 3,503,917; 4,123,403; and 5,037,864, all incorporated herein by reference. It has surprisingly been discovered that a film having a substantially uniform thickness across a substrate or form can be prepared at room temperature (that is, from about 20° C. to about 30° C.) from the aqueous dispersion described hereinabove. The film is further characterized by an absence of cracking or foramina.

The film can be prepared by any suitable means such as casting, coagulating, or spraying. If films are prepared by coagulation, it is generally preferred to use fatty acid based surfactants, such as the sodium salt of oleic acid.

The following example is for illustrative purposes only and is not intended to limit the scope of the invention. All percentages are by weight unless otherwise noted.

EXAMPLE 1

A Cast Film of an Ethylene-1-Butene Latex

To a 2-liter vessel is added a solution of EXACT® 4028 plastomer in cyclohexane (612 g, 10 percent solids), a solution of RHODAPEX™ CO-436 surfactant (a trademark of Rhone-Poulenc, 11.5 g, 28 percent solids), and water (288 g). The weight average molecular weight of the plastomer is determined to be 62,300 amu (number average molecular weight 32,700 amu) by gel permeation chromatography using a Waters 150° C. high temperature chromatographic unit equipped with three linear-mixed columns (10-micron particle size), operating at 140° C. (100 μL injection of 0.5 percent polymer in 1,2,4-trichlorobenzene, flow rate of 1 ml/minute).

The polymer solution, the surfactant, and water are emulsified using a Siverson homogenizer by mixing at the highest setting (nominally 8000 rpm) for 10 minutes. The cyclohexane solvent is removed in vacuo from the emulsion by heating in a glass rotovap maintained at 40° C. The resulting artificial latex is concentrated by applying a vacuum of 25 inches of Hg to the latex with continued heating. After the latex reached 36 percent solids, the latex is removed from the heat and allowed to cool.

A film of the latex is prepared as follows: A small quantity of the latex is poured on a glass plate and is uniformly spread using a draw bar with a nominal gap of 0.25 mm. The latex is allowed to dry at room temperature and form a coherent film upon drying. The film is placed into a forced air oven at 60° C. for a few minutes to drive off any remaining water. The film is allowed to cool on the glass plate and then removed and tested. The film is found to have an ultimate tensile of 2080 psi and a percent elongation of 787 percent.

What is claimed is:

1. A film-forming, artificial latex comprising a stable aqueous dispersion of a linear copolymer of ethylene and a $C_3$–$C_{20}$ α-olefin having:
   a) a polydispersity index not greater than 2.5;
   b) a random distribution of comonomer units along the polymer backbone;
   c) a homogeneity index of at least 75; and either or both of
   d) an absence of polar substituents along the polymer backbone; and
   e) a weight average molecular weight of at least 45,000 amu.

2. The film-forming, artificial latex of claim 1 wherein the $C_3$–$C_{20}$ α-olefin has a an absence of polar substituents along the polymer backbone and a weight average molecular weight of at least 45,000 amu.

3. The film-forming, artificial latex of claim 1 wherein the $C_3$–$C_{20}$ α-olefin comprises 1-butene, 1-hexene, 1-octene, or 1-octadecene.

4. The film-forming, artificial latex of claim 1 wherein the dispersion is stabilized with a stabilizing amount of an ethoxylated phenol represented by the formula:

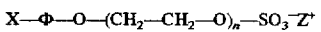

wherein X is a $C_6$–$C_{18}$ linear or branched alkyl group; Φ is phenylene; n is from 4 to 32; and Z is sodium, potassium, or ammonium.

5. The film-forming, artificial latex of claim 1 wherein the copolymer does not contain acetate, ester, ether, amine, alcohol, acrylic, methacrylic, halogen, nitrile, nitro, sulfate, phosphate, or mercaptan groups.

6. The film-forming, artificial latex of claim 1 that is film forming at room temperature.

* * * * *